(12) United States Patent
Pretty

(10) Patent No.: US 10,711,646 B2
(45) Date of Patent: Jul. 14, 2020

(54) CATCH ASSEMBLY FOR CONTROLLING OPENING OF A DOOR

(71) Applicant: Rohr, Inc., Chula Vista, CA (US)

(72) Inventor: Michael Sean Pretty, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 85 days.

(21) Appl. No.: 16/026,232

(22) Filed: Jul. 3, 2018

(65) Prior Publication Data

US 2020/0011202 A1  Jan. 9, 2020

(51) Int. Cl.
| | |
|---|---|
| *F01D 25/24* | (2006.01) |
| *E05B 83/00* | (2014.01) |
| *E05C 7/04* | (2006.01) |
| *E05C 17/48* | (2006.01) |
| *E05C 17/50* | (2006.01) |
| *E05C 19/10* | (2006.01) |

(52) U.S. Cl.
CPC .............. *F01D 25/24* (2013.01); *E05B 83/00* (2013.01); *E05C 7/04* (2013.01); *E05C 17/48* (2013.01); *E05C 17/50* (2013.01); *E05C 19/10* (2013.01); *E05Y 2900/502* (2013.01); *F05D 2220/323* (2013.01); *F05D 2240/10* (2013.01)

(58) Field of Classification Search
CPC . F01D 25/24; E05C 7/04; E05C 17/48; E05C 17/52; E05C 19/10
See application file for complete search history.

(56) References Cited

U.S. PATENT DOCUMENTS

| | | | |
|---|---|---|---|
| 1,037,377 A * | 9/1912 | Von Gunten | ............ E05C 17/28 292/273 |
| 3,347,578 A | 10/1967 | Sheehan et al. | |
| 4,925,223 A | 5/1990 | Craft | |
| 6,021,636 A * | 2/2000 | Johnson | ............. E05B 47/0603 244/110 B |
| 8,659,307 B2 * | 2/2014 | Eriksen | ................. B64D 29/06 324/690 |
| 9,376,215 B2 | 6/2016 | Forcier | |
| 9,758,234 B2 | 9/2017 | Harding et al. | |
| 9,951,718 B2 | 4/2018 | Brown | |
| 9,963,237 B2 | 5/2018 | Pretty | |
| 9,988,157 B2 * | 6/2018 | Lee | ......... B64D 29/06 |
| 2004/0100107 A1 | 5/2004 | Masseth, Jr. | |
| 2013/0328326 A1 | 12/2013 | Defrance | |
| 2016/0053719 A1 * | 2/2016 | Pretty | .................... B64D 29/00 239/265.19 |

FOREIGN PATENT DOCUMENTS

EP        1031693 B1    7/2004

OTHER PUBLICATIONS

EP search report for EP19184109.7 dated Oct. 30, 2019.

* cited by examiner

*Primary Examiner* — Ninh H. Nguyen
(74) *Attorney, Agent, or Firm* — Getz Balich LLC

(57) ABSTRACT

A catch assembly is provided that includes a keeper, a guide and a catch. The catch includes a catch mount, a catch arm and a catch hook. The catch arm is cantilevered from the catch mount. The catch arm extends longitudinally away from the catch mount to a distal end of the catch. The catch hook is connected to the catch arm at the distal end. The catch is configured to bias the catch hook against the guide. The catch hook is configured to slide longitudinally along the guide from a first position to a second position where the catch hook engages the keeper.

20 Claims, 11 Drawing Sheets

CATCH ASSEMBLY FOR CONTROLLING OPENING OF A DOOR

BACKGROUND

1. Technical Field

This disclosure relates generally to a door assembly and, more particularly, to controlling opening of a door assembly.

2. Background Information

Various assemblies are known in the art for controlling opening of a door. A nacelle for an aircraft propulsion system, for example, typically includes multiple latch assemblies. Such latch assemblies are typically configured to secure a nacelle door in a closed position when the latch assemblies are latched, and further configured to enable free movement of the nacelle door when the latch assemblies are unlatched. Such free movement, however, can lead to an unwanted and/or uncontrolled opening of the nacelle door when, for example, the nacelle door is unsupported or inappropriately supported when the latch assemblies are unlatched. Such unwanted and/or uncontrolled opening of the nacelle door may lead to operator injury and/or damage of the nacelle door and/or other nacelle components. There is a need in the art therefore for improved systems for controlling opening of a door such as a nacelle door for a gas turbine engine aircraft propulsion system nacelle.

SUMMARY OF THE DISCLOSURE

According to an aspect of the present disclosure, a catch assembly is provided that includes a keeper, a guide and a catch. The catch includes a catch mount, a catch arm and a catch hook. The catch arm is cantilevered from the catch mount. The catch arm extends longitudinally away from the catch mount to a distal end of the catch. The catch hook is connected to the catch arm at the distal end. The catch is configured to bias the catch hook against the guide. The catch hook is configured to slide longitudinally along the guide from a first position to a second position where the catch hook engages the keeper.

According to another aspect of the present disclosure, an assembly is provided for a nacelle of an aircraft propulsion system. This assembly includes a nacelle component, a nacelle door, a latch assembly and a catch assembly. The nacelle door is configured to move between a closed position and an open position. The latch assembly is configured to secure the nacelle door to the nacelle component when the nacelle door is in the closed position. The catch assembly is configured to secure the nacelle door to the nacelle component when the nacelle door is in a partially open position between the closed position and the open position.

According to still another aspect of the present disclosure, another assembly is provided for a nacelle of an aircraft propulsion system. This assembly includes a nacelle component, a nacelle door and a catch assembly. The nacelle door is configured to move between a closed position and an open position. The catch assembly is configured to secure the nacelle door to the nacelle component when the nacelle door is in a partially open position between the closed position and the open position. The catch assembly includes a keeper and a catch. The keeper is mounted to the nacelle component. The catch is mounted to the nacelle door. The catch includes a cantilevered catch arm and a catch hook. The cantilevered catch arm extends longitudinally to a distal end of the catch. The catch hook is connected to the cantilevered catch arm at the distal end. The catch hook is configured to move longitudinally from a first position to a second position where the catch hook engages the keeper.

The catch hook may be configured to lift off from the guide and disengage from the keeper when the catch arm is subject to an external force with at least a component that is greater than and opposite to an internal force that biases the catch hook against the guide.

The catch arm may be connected to the catch mount at a connection. The catch arm may be configured to pivot about the connection.

The catch may be configured as a monolithic body.

The catch may be configured from a single sheet of cut and formed material.

The catch may also include a hinge and a spring. The catch arm may be connected to the catch mount by the hinge. The spring may be configured to bias the catch arm towards the guide.

The catch arm may be rigid.

The guide may include a base and a pair of rails disposed laterally on opposing sides of and connected to the base. The catch hook may be configured to slide longitudinally against the base while laterally between the rails.

The base may be configured with one or more through holes disposed along at least a portion of a longitudinal length thereof.

The keeper may be configured as a portion of an aircraft nacelle longeron.

The catch assembly may be discrete from the latch assembly.

A gap may extend between the nacelle door and the nacelle component when the nacelle door is in the partially open position. The gap may be sized large enough to enable disengagement of a catch of the catch assembly for enabling movement of the nacelle door from the partially open position towards the open position.

The gap may be sized large enough for a hand of an operator to pass through the gap and reach the catch.

The nacelle door may include a first nacelle door. The nacelle component may include a second nacelle door configured to move between a closed position and an open position.

The nacelle door may be arranged such that gravity biases the door towards the open position when the door is in the closed position and the partially open position.

The catch assembly may include a keeper and a catch. The catch may include a catch mount, a catch arm and a catch hook. The catch arm may be cantilevered from the catch mount. The catch arm may extend longitudinally away from the catch mount to a distal end of the catch. The catch hook may be connected to the catch arm at the distal end. The catch hook may be configured to move longitudinally from a first position to a second position where the catch hook engages the keeper.

The catch assembly may include a guide. The catch may be configured to bias the catch hook against the guide. The catch hook may be configured to slide along the guide from the first position to the second position.

The nacelle door may be in the closed position when the catch hook is in the first position. The nacelle door may be in the partially open position when the catch hook is in the second position.

The assembly may also include a second catch assembly. This second catch assembly may be configured to further secure the nacelle door to the nacelle component when the nacelle door is in the partially open position. The second catch assembly may be spaced from the catch assembly such that a single operator alone cannot disengage both the latch assembly and the second latch assembly. However, the second catch assembly may alternatively be positioned such that the operator may disengage both the latch assembly and the second latch assembly without assistance from another operator.

The foregoing features and the operation of the invention will become more apparent in light of the following description and the accompanying drawings.

DETAILED DESCRIPTION

Figure 1:
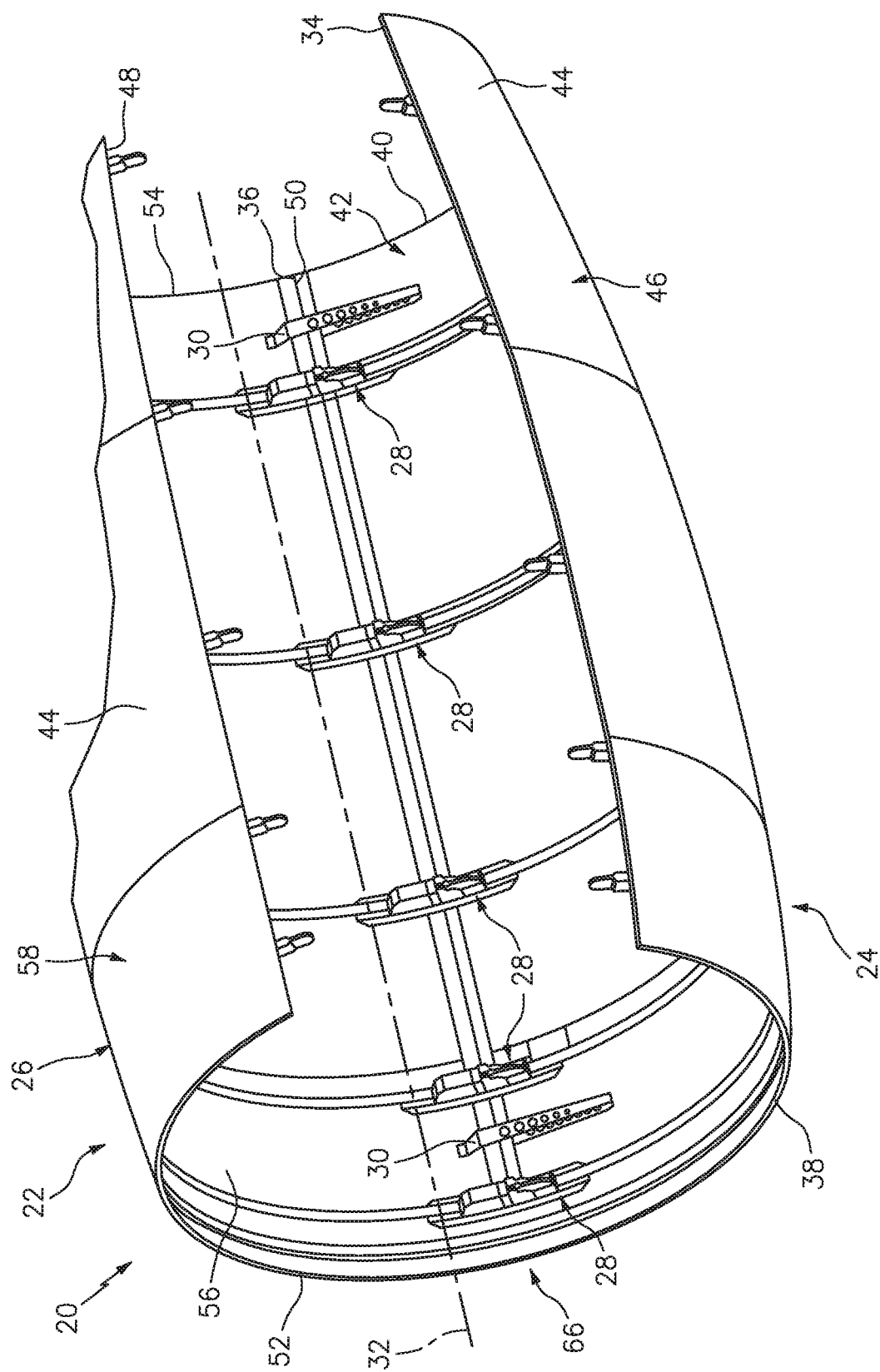
FIG. 1 is a partial perspective illustration of a door assembly for a nacelle of an aircraft propulsion system with nacelle doors in closed positions, in accordance with various embodiments.

FIG. 1 is a partial perspective illustration of a door assembly 20 for a nacelle 22 of an aircraft propulsion system. While this door assembly 20 is described below with reference to components of an aircraft propulsion system nacelle for ease of description, the present disclosure is not limited to such applications. In other embodiments, for example, the door assembly 20 may be configured with another aircraft apparatus such as, but not limited to, an aircraft fuselage. In still other embodiments, the door assembly 20 may be configured for non-aircraft applications; e.g., any application which would benefit from inclusion of a catch to at least temporarily secure at least one door in a partially open position as described below in further detail.

Referring again to FIG. 1, the door assembly 20 includes a first (e.g., gravitational lower) nacelle door 24, a nacelle component 26, one or more latch assemblies 28 and one or more catch assemblies 30. In the embodiment of FIG. 1, the nacelle component 26 is configured as and therefore referred to below as a second (e.g., gravitational upper) nacelle door for the nacelle 22. However, in other embodiments, the nacelle component 26 may alternatively be configured as a static (e.g., fixed, immovable) structure of the nacelle 22.

The first nacelle door 24 extends circumferentially about an axial centerline 32 (e.g., a central axis) of the nacelle 22 between a circumferential first proximal edge 34 of the door 24 and a circumferential first distal edge 36 of the door 24. The first nacelle door 24 extends axially along the centerline 32 between a first upstream, forward end 38 of the door 24 and a first downstream, aft end 40 of the door 24. The first nacelle door 24 extends radially, relative to the centerline 32, between a radial first inner/interior side 42 of the door 24 and a first portion of an exterior flow surface 44 of the nacelle 22 at a radial outer/exterior side 46 of the door 24.

The second nacelle door 26 extends circumferentially about the centerline 32 between a circumferential second proximal edge 48 of the door 26 and a circumferential second distal edge 50 of the door 26. The second nacelle door 26 extends axially along the centerline 32 between a second upstream, forward end 52 of the door 26 and a second downstream, aft end 54 of the door 26. The second nacelle door 26 extends radially, relative to the centerline 32, between a radial second inner/interior side 56 of the door 26 and a second portion of the exterior flow surface 44 at a radial second outer/exterior side 58 of the door 26.

Figure 2:
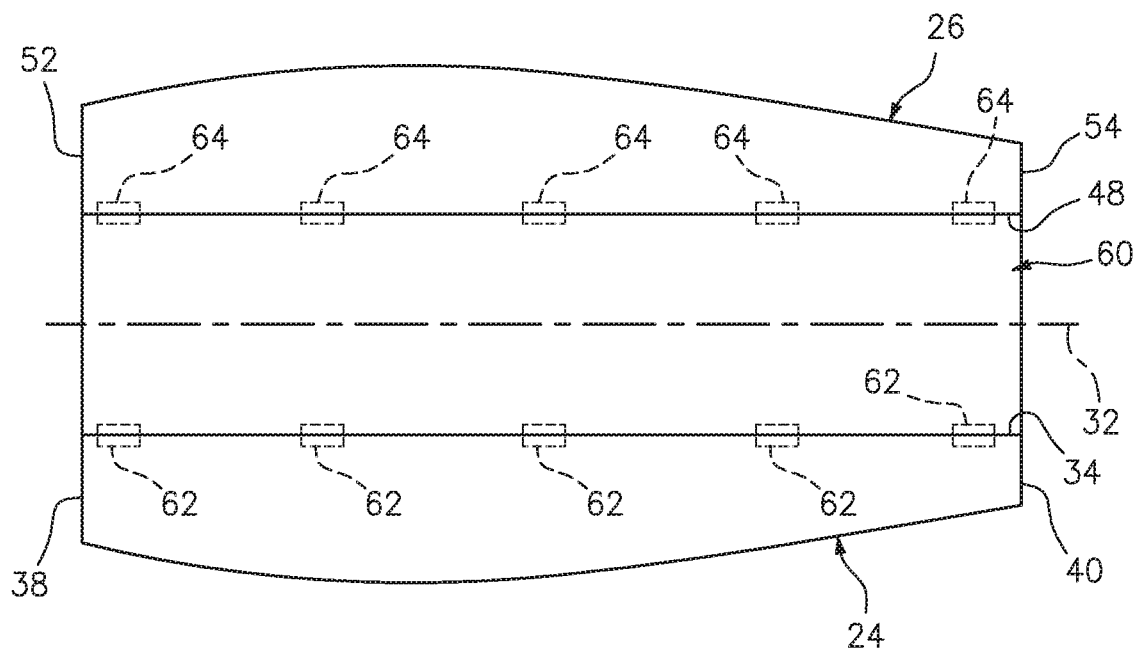
FIG. 2 is a schematic illustration of the door assembly configured with a static structure, in accordance with various embodiments.
Figure 3:
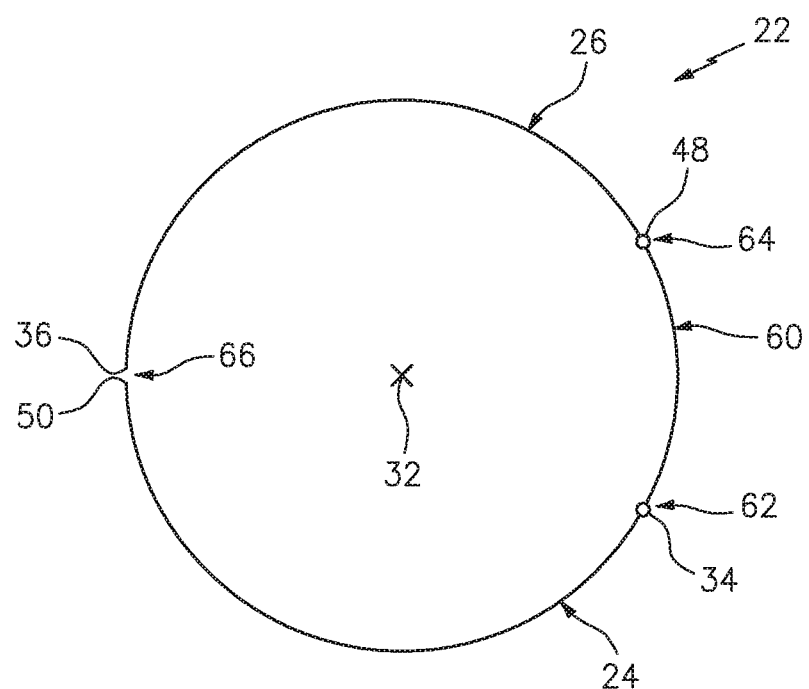
FIG. 3 is a schematic sectional illustration of the assembly of FIG. 2 with the nacelle doors in the closed positions, in accordance with various embodiments.
Figure 4:
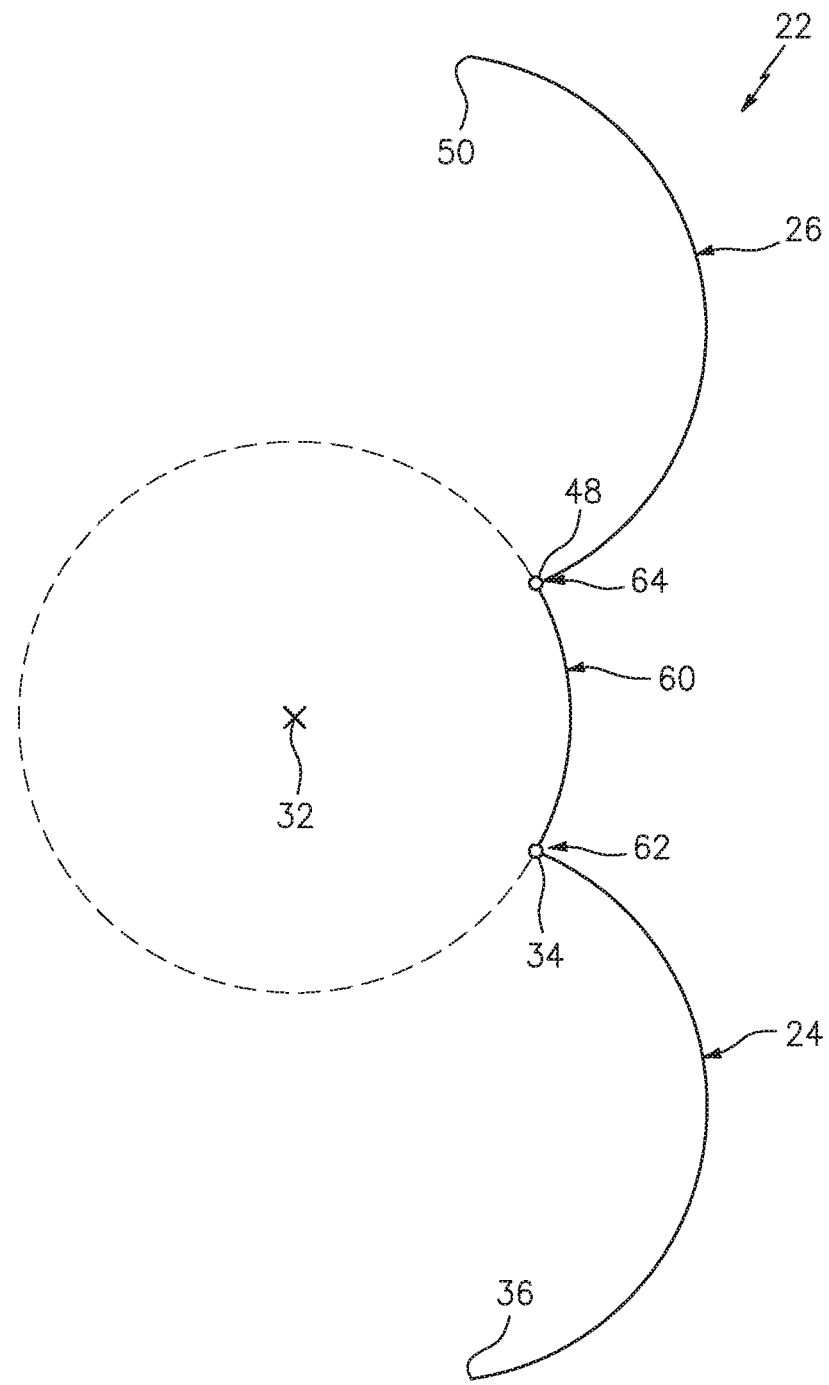
FIG. 4 is a schematic sectional illustration of the assembly of FIG. 2 with the nacelle doors in open positions, in accordance with various embodiments.

Referring to FIGS. 2-4, the first nacelle door 24 and the second nacelle door 26 are each movably mounted to a static structure 60 of the nacelle 22. Each nacelle door 24, 26 of FIG. 2, for example, is pivotally mounted to the static structure 60 by one or more hinge assemblies 62, 64, which are located at (e.g., on, adjacent or proximate) the proximal edge 34, 48 of the respective door 24, 26. In this manner, each nacelle door 24, 26 may move (e.g., pivot) between a closed position (see FIGS. 1 and 3) and an open position (see FIGS. 4 and 5). When the nacelle doors 24 and 26 are in their closed positions (see FIGS. 1 and 3), the first distal edge 36 and, thus, the first nacelle door 24 meets with (e.g., is adjacent to and aligned with) the second distal edge 50 and, thus, the second nacelle door 26 at a door seam 66.

Referring to FIG. 1, the latch assemblies 28 are arranged with the nacelle doors 24 and 26 at discrete (e.g., different) axial locations along the door seam 66. Each of these latch assemblies 28 is configured to secure the nacelle doors 24 and 26 together as well as maintain the nacelle doors 24 and 26 in the closed positions as shown in FIG. 1 (see also FIG. 3) when that latch assembly 28 is latched. Each of the latch assemblies 28 is also configured to enable the nacelle doors 24 and 26 to be freely moved (e.g., pivoted) from the closed positions towards the open positions when unlatched. Herein, the term "freely" may describe relatively unencumbered movement. For example, when the latch assemblies 28 are all unlatched, the latch assemblies 28 may be configured such that none of the latch assemblies 28 prevent, slow or otherwise inhibit opening of either the first nacelle door 24 or the second nacelle door 26. Various types and configurations of latch assemblies are known in the art, and the present disclosure is not limited to any particular types or configurations thereof.

The catch assemblies 30 are arranged with the nacelle doors 24 and 26 at discrete axial locations along the door seam 66. In the embodiment of FIG. 1, the locations of the catch assemblies 30 are different from the locations of the latch assemblies 28. For example, each catch assembly 30 may be separated from each axially adjacent latch assembly 28 by an axial (non-zero) distance. Thus, in the embodiment of FIG. 1, each catch assembly 30 is configured discrete from (e.g., not a part of) each of the latch assemblies 28.

Figure 5:
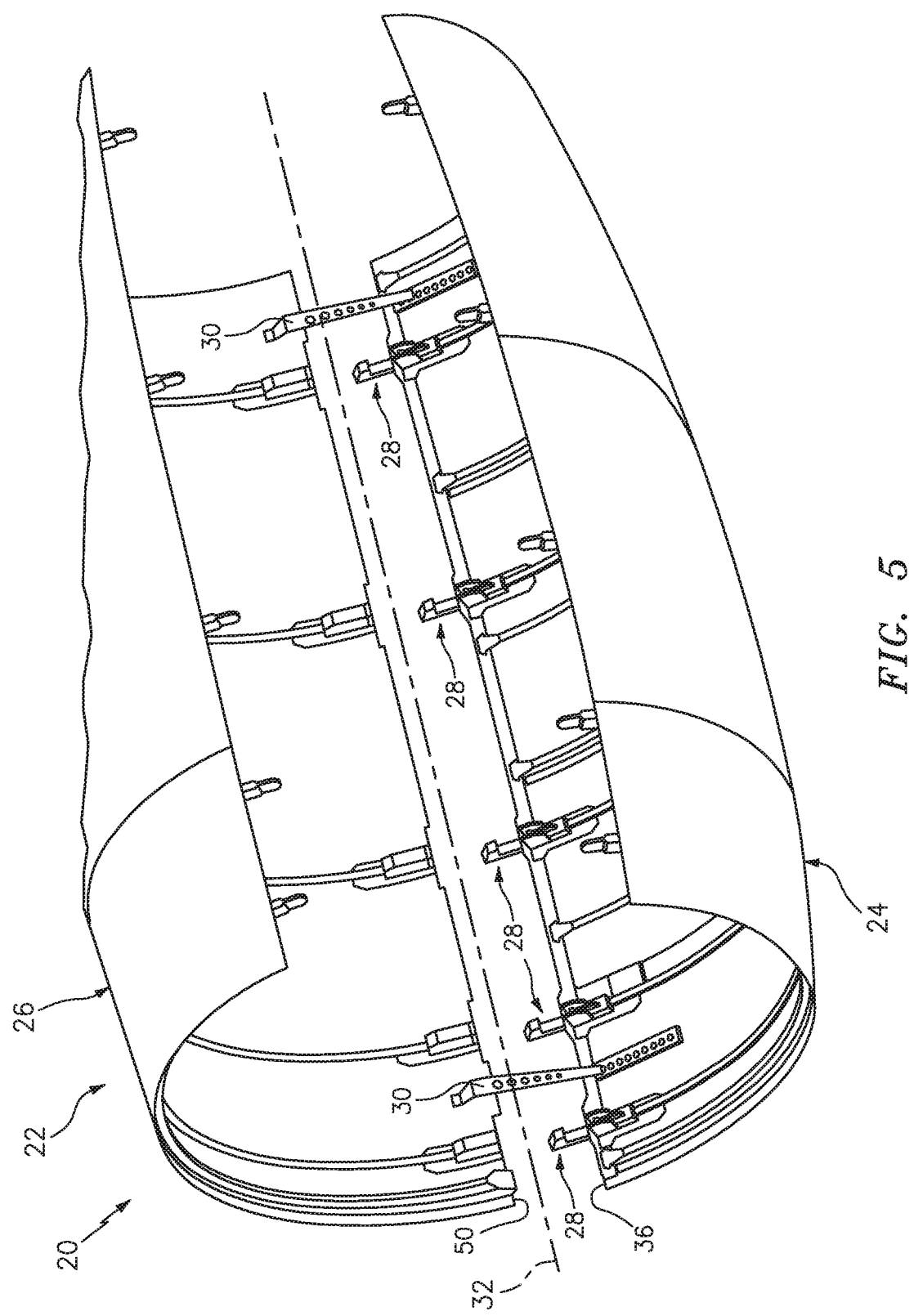
FIG. 5 is a partial perspective illustration of the door assembly of FIG. 1 with the nacelle doors in partially open positions, in accordance with various embodiments.

The catch assemblies 30 are configured to prevent at least one, or both, of the nacelle doors 24 and 26 from uncontrollably opening after the latch assemblies 28 are unlatched. For example, after the latch assemblies 28 are unlatched, the first nacelle door 24 may tend to swing open (e.g., down) given its orientation relative to gravity in the embodiment of FIG. 1. To prevent this first nacelle door 24 from opening (moving from the closed position towards the open position) uncontrollably (e.g., without support), each of the catch assemblies 30 is configured to stop movement (e.g., pivoting) of at least the first nacelle door 24 at a partially open position between the open position and the closed position as shown in FIG. 5. More particularly, each of the catch assemblies 30 is configured to (e.g., automatically) secure the nacelle doors 24 and 26 together at the partially open position shown in FIG. 5 as, for example, the first nacelle door 24 begins to move from the closed position to the open position. Each of the catch assemblies 30 is also configured to enable the nacelle doors 24 and 26 to be freely moved (e.g., pivoted) from the partially open positions towards the open positions when (e.g., manually) disengaged.

Figure 6:
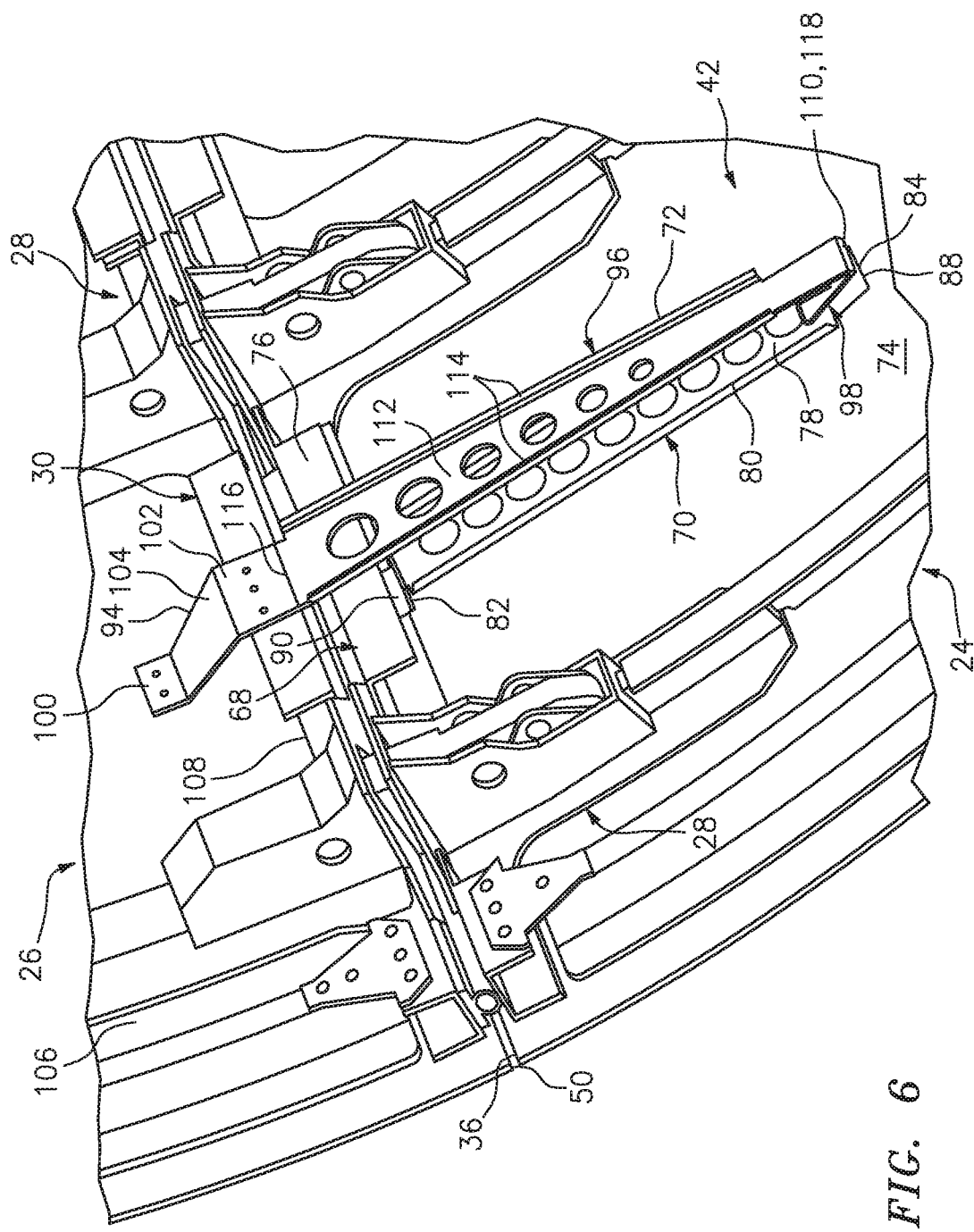
FIG. 6 is a perspective illustration of a portion of the door assembly of FIG. 1, in accordance with various embodiments.
Figure 7:
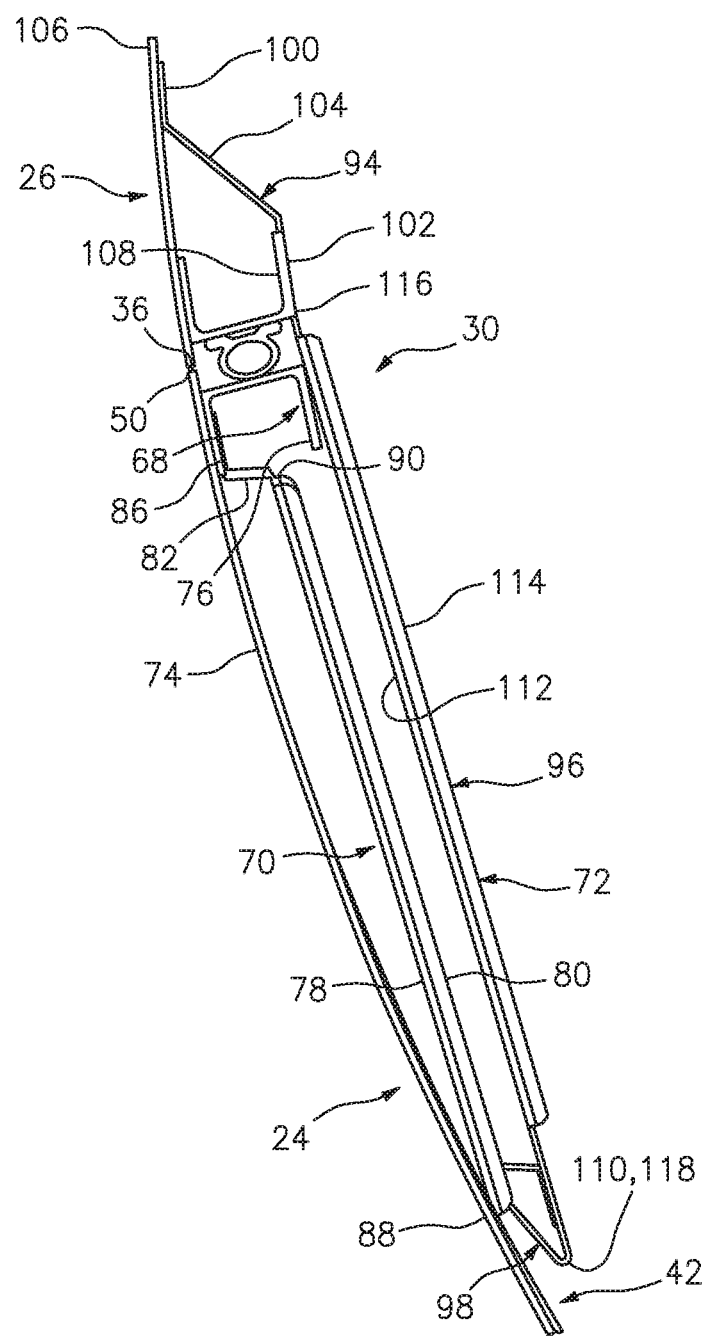
FIG. 7 is a sectional illustration of a portion of the door assembly of FIG. 1, in accordance with various embodiments.
Figure 8:
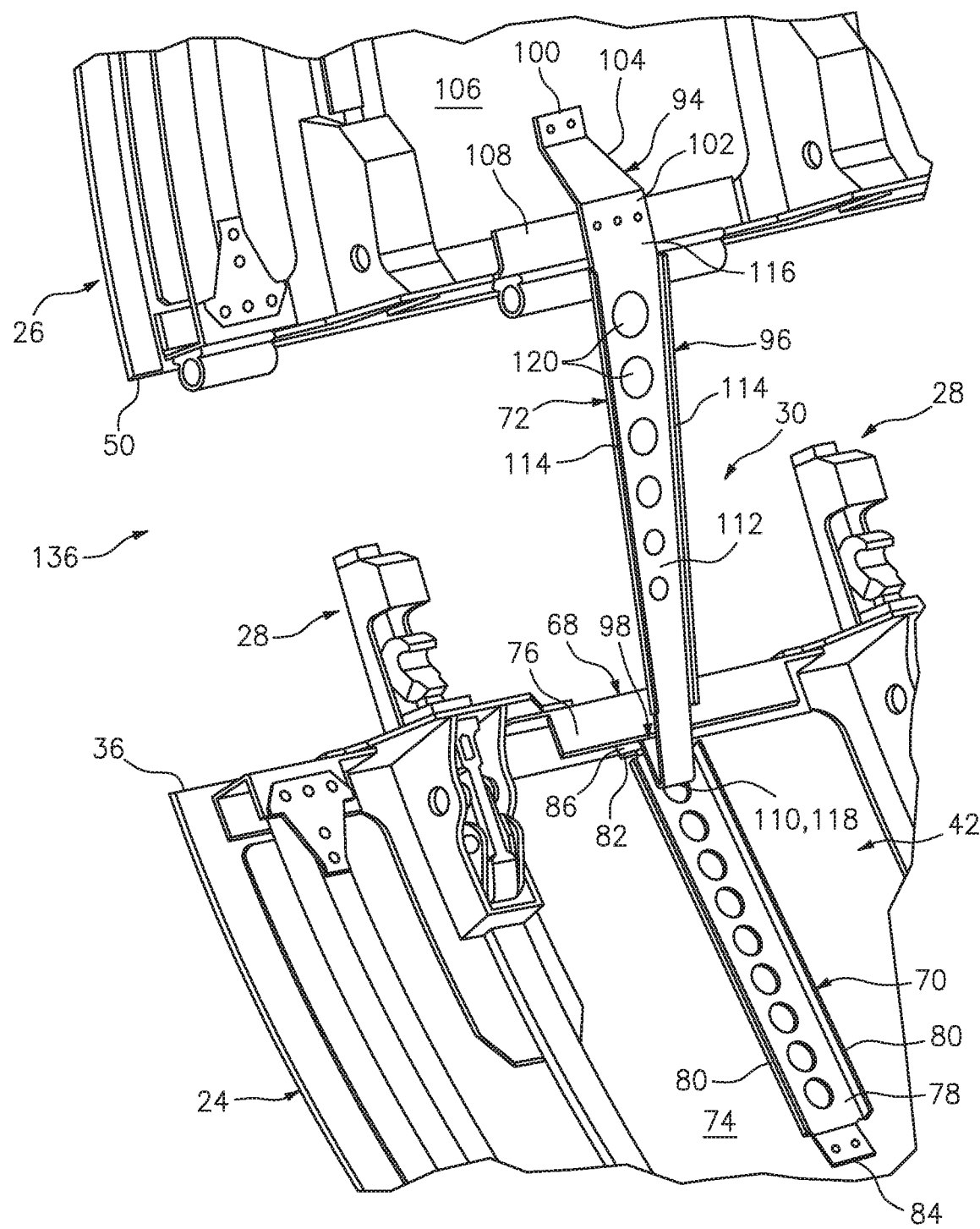
FIG. 8 is a perspective illustration of a portion of the door assembly of FIG. 5, in accordance with various embodiments.
Figure 9:
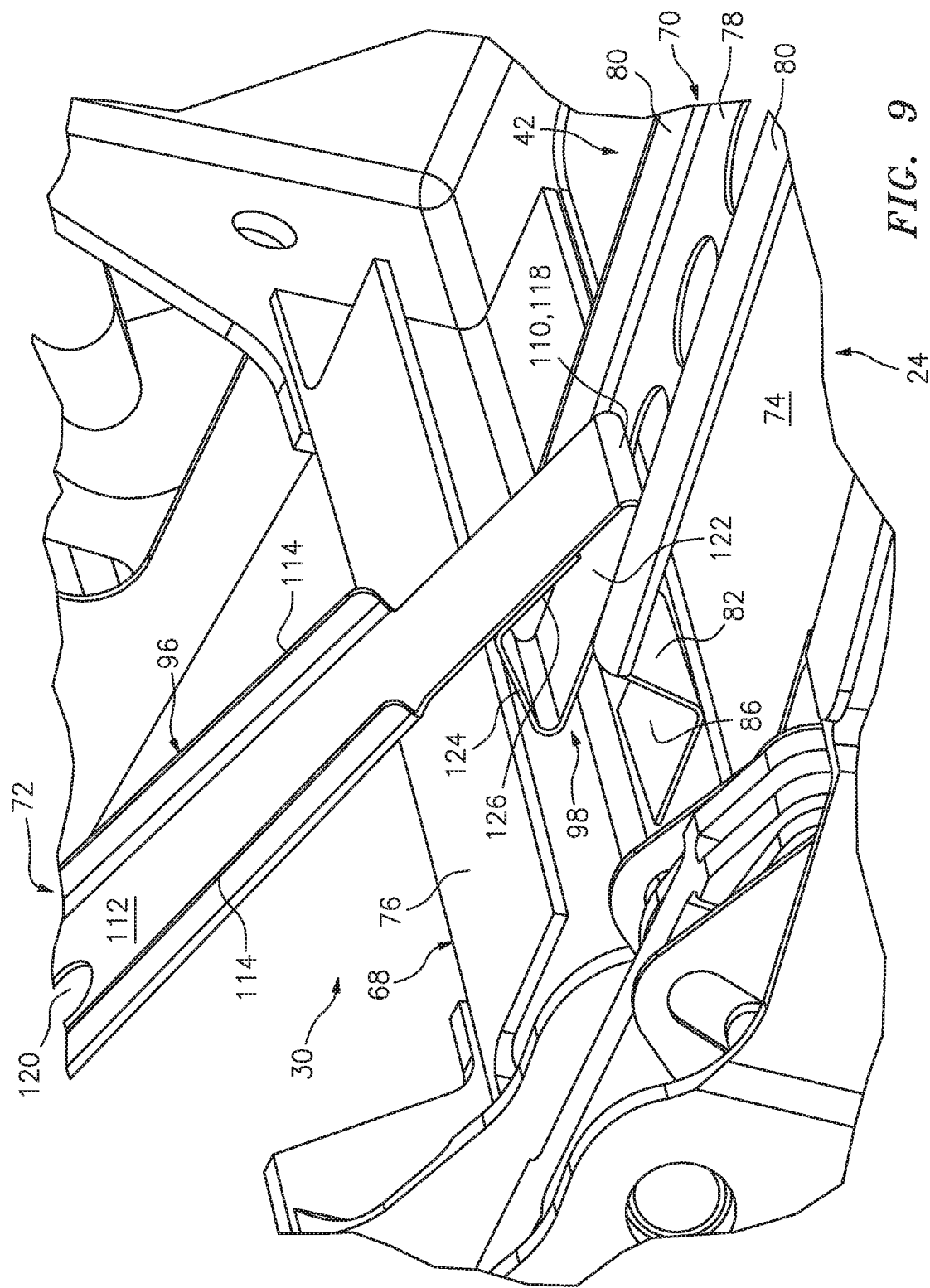
FIG. 9 is a perspective illustration of a portion of the door assembly of FIG. 5, in accordance with various embodiments.

FIGS. 6 and 7 illustrate an exemplary one of the catch assemblies 30 with the nacelle doors 24 and 26 in the closed positions. FIGS. 8 and 9 illustrate the catch assembly 30 with at least the first nacelle door 24 in the partially open position. Note, in this embodiment, the second nacelle door 26 is in its closed position; however, in other embodiments, the second nacelle door 26 may also or alternatively be in a partially open position depending upon the configuration of the nacelle 22 with respect to gravity, for example. Referring to FIGS. 6-9, each catch assembly 30 includes a keeper 68, a guide 70 and a catch 72.

The keeper 68 of FIGS. 6-9 is configured as a portion of an aircraft nacelle longeron. This longeron is a part of a framework for the first nacelle door 24. More particularly, the longeron is configured as a structural stiffener (e.g., a length of C-channel) for the first nacelle door 24. The longeron and, thus, the keeper 68 are arranged at the first distal edge 36 of the first nacelle door 24. With this configuration, the keeper 68 is mounted to a skin 74 of the first nacelle door 24. The keeper 68 includes a cantilevered flange 76, which projects laterally (e.g., circumferentially or tangentially) in a direction away from the first distal edge 36 of the door 24 to a distal end of the keeper 68. While this keeper 68 embodiment is integrated as part of the first nacelle door 24, the keeper 68 may alternatively have its own body formed discrete from and then mounted to the door 24.

The guide 70 may be configured as a (e.g., monolithic) ramp-like body. The guide 70 of FIGS. 6-9, for example, includes a guide base 78, one or more guide rails 80, a riser 82 and one or more mounts 84 and 86. The guide base 78 extends longitudinally (lengthwise) between a first end 88 and a second end 90. The first end 88 of the guide base 78 is adjacent and connected to the first mount 84. The second end 90 of the guide base 78 is adjacent and connected to a radial inner end of the riser 82, which riser 82 projects in a radially outward direction from the guide base 78 to a radial outer end that is adjacent and connected to the second mount 86. The guide rails 80 are connected to and disposed on opposing sides of the guide base 78. Each guide rail 80 projects out from the guide base 78 in a general radial inward direction to a distal edge. Each guide rail 80 may extend longitudinally along substantially (e.g., at least 80-90 percent) an entire length of the guide base 78 between its ends 88 and 90. With this configuration, the guide rails 80 may serve to stiffen the guide base 78 such that the guide 70 is rigid; e.g., relatively inflexible. Each mount 84, 86 is disposed on the first interior side 42 of and attached (e.g., mechanically fastened and/or bonded) to the first nacelle door 24. The second mount 86 is located at the first distal edge 36 of the first nacelle door 24. The first mount 84 is located circumferentially inward from the first distal edge 36 of the first nacelle door 24.

The catch 72 includes a catch mount 94, a catch arm 96 and a catch hook 98. The catch mount 94 is configured to attach the catch 72 fixedly to the second nacelle door 26. The catch mount 94 of FIGS. 6-8, for example, includes one or more mounts 100 and 102 and a riser 104. This riser 104 extends between and is connected to the first mount 100 and the second mount 102. The first mount 100 is attached to a skin 106 of the second nacelle door 26. The second mount 102 is attached to a structural stiffener 108 (e.g., an aircraft nacelle longeron) of a framework for the second nacelle door 26, which stiffener 108 is located at the second distal edge 50.

The catch arm 96 is cantilevered from the catch mount 94. The catch arm 96 of FIGS. 6-8, for example, projects longitudinally out from the catch mount 94 and its second mount 102 to a distal (e.g., unsupported) end 110 of the catch 72. Thus, the catch arm 96 extends longitudinally away from the catch mount 94 to the distal end 110 of the catch 72, thereby overlapping the first nacelle door 24 when the doors 24 and 26 are closed.

The catch arm 96 of FIG. 6-9 includes an arm base 112 and one or more arm rails 114. The arm base 112 extends longitudinally (lengthwise) between a first end 116 and a second end 118 at the distal end 110. The first end 116 of the arm base 112 is adjacent and connected to the second mount 102. The arm rails 114 are connected to and disposed on opposing sides of the arm base 112. Each arm rail 114 projects out from the arm base 112 (e.g., in a general radial inward direction) to a distal edge. Each arm rail 114 may extend longitudinally along substantially (e.g., at least 80-90 percent) an entire length of the arm base 112 between its ends 116 and 118. With this configuration, the arm rails 114 may serve to stiffen the arm base 112 such that the catch arm 96 is rigid.

In some embodiments, the catch arm 96 may be perforated. The catch arm 96 and its base, for example, may be configured with one or more through holes 120; see FIG. 8. These through holes 120 may be disposed along at least a (e.g., central) portion of the longitudinal length of the base 112.

The catch hook 98 is connected to the catch arm 96 at the distal end 110 of the catch 72. The catch hook 98 of FIG. 9 includes one or more catch segments 122, 124 and 126; see FIG. 9. The first catch segment 122 is adjacent and connected to the second end 118 of the arm base 112, and extends from the second end 118 to the second catch segment 124. The connection between the first catch segment 122 and the second catch segment 124 is displaced radially outward from the catch arm 96, and positioned longitudinally between the catch mount 94 and the distal end 110 of the catch 72. The second catch segment 124 extends radially inward from the first catch segment 122 to the third catch segment 126, which extends along, is flat against and may be attached to a portion of the catch arm base 112 between the second catch segment 124 and the distal end 110.

Figure 10:
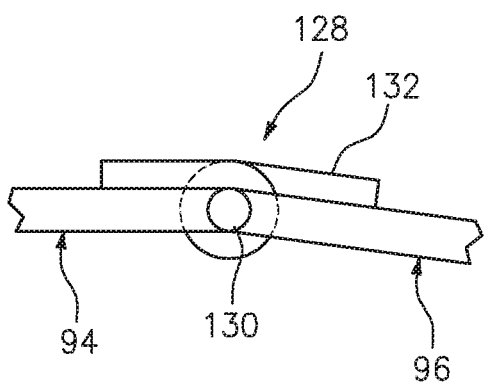
FIG. 10 is a schematic side illustration of a portion of a latch for the door assembly, in accordance with various embodiments.

The configuration of the catch 72 illustrated in FIGS. 6-9 enables formation of the catch 72 from a single sheet of cut and formed material; e.g., sheet metal. However, the present disclosure is not limited to such a catch formation, materials, or to the specific exemplary configuration shown in the figures. For example, in other embodiments, the catch arm 96 may be connected to the catch mount 94 via a hinge assembly 128 as shown in FIG. 10. This hinge assembly 128 include a hinge 130 that pivotally connects the catch arm 96 to the catch mount 94. The hinge assembly 128 also includes a torsions spring 132 that biases the distal end 110 of the catch 72 in a radial outward direction.

Figure 11:
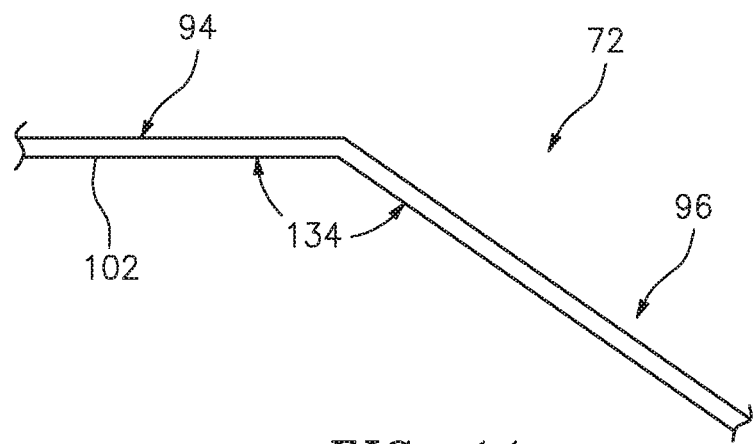
FIGS. 11 and 12 are schematic side illustrations of a portion of another latch for the door assembly pre- and post-installation, respectively, in accordance with various embodiments.
Figure 12:
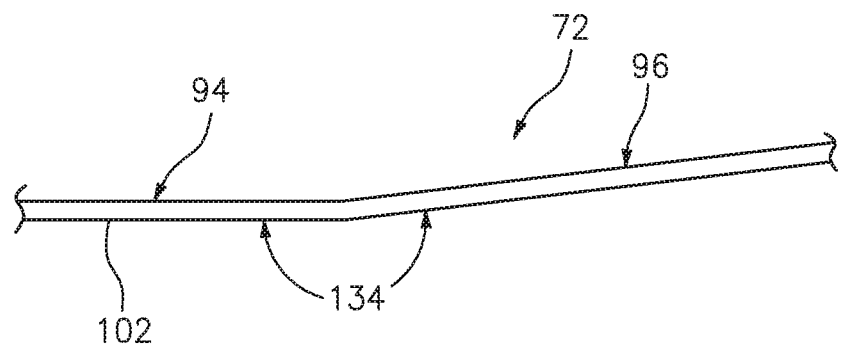

Referring to FIGS. 6 and 7, when the nacelle doors 24 and 26 are in the closed positions, the catch hook 98 engages the guide 70 at a longitudinal first position. The catch 72 is biased against the guide 70 by the catch arm 96. This bias may be provided by an internal force (e.g., a resilience force) exerted by catch material, for example, at the connection between the catch arm 96 and the catch mount 94. For example, before installation (see FIG. 11), an angle 134 between the second mount 102 and the catch arm 96 may have a first value. By contrast, when installed (see FIG. 12), the angle 134 between the second mount 102 and the catch arm 96 may have a second value that is greater than the first value. With such a configuration, the catch arm 96 is resiliently bent (e.g., flexed) relative to the catch mount 94 when installed such that a spring/resilience force generated by the bending causes the catch arm 96 to generate the internal force and bias the catch hook 98 against the guide 70.

Figure 13:
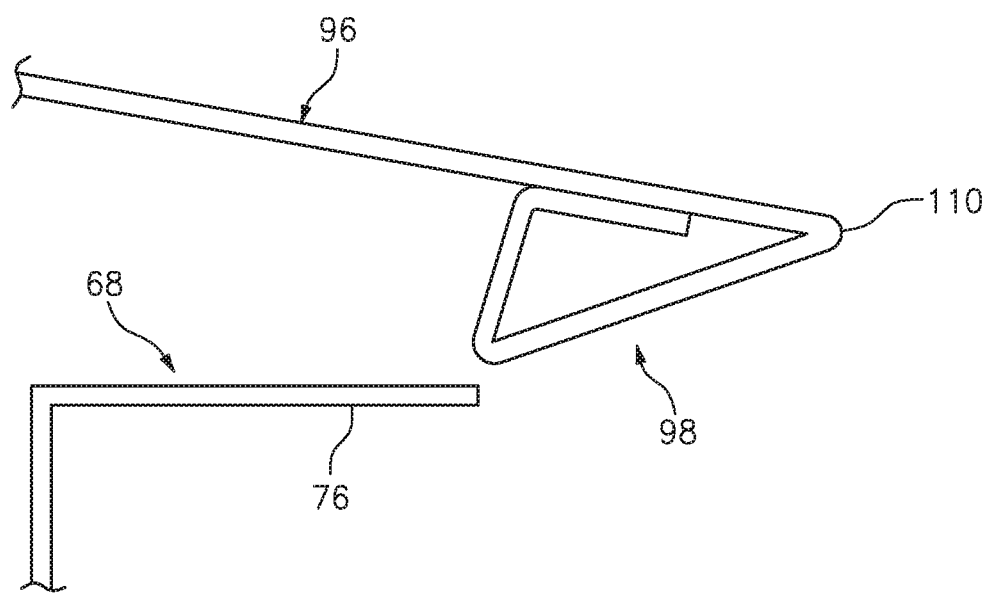
FIG. 13 is a side schematic illustration of a portion of a latch assembly being disengaged, in accordance with various embodiments.

When the nacelle doors 24 and 26 move from the closed positions towards the open positions, the catch hook 98 slides longitudinally along the guide 70, between the rails 80, from the first position towards a longitudinal second position (see FIGS. 8 and 9). At this second position, the catch hook 98 engages the keeper 68. More particularly, the catch hook 98 projects longitudinally into a gap between the flange 76 and the skin 74 of the first nacelle door 24. In this manner, the catch hook 98 and generally the catch 72 is operable to arrest further opening of the nacelle doors 24 and 26 past the partially open positions of FIGS. 8 and 9. Therefore, when the catch hook 98 is at the second position, the catch 72 are operable to secure the nacelle doors 24 and 26 together and prevent further opening of the nacelle doors 24 and 26. The catch 72 may be disengaged, however, by subjecting the catch arm 96 to an external force having at least a component that is opposite and greater than the internal force. For example, a human operator may pass a hand through a gap 136 (see FIG. 8) between the distal edges 36 and 50 and press against the catch arm 96 such that the arm 96 bends radially inward to thereby disengage the catch 72; e.g., lift the catch hook 98 away from the keeper 68 as shown in FIG. 13. The nacelle doors 24 and 26 may then be opened further without encumbrance from the catch assembly 30.

In some embodiments, the orientation of one or more of the catch assemblies 30 and/or the orientation of one or more of the latch assemblies 28 may be reversed. For example, the catch 72 may be mounted to the first nacelle door 24 and the keeper 68 and the guide 70 may be mounted to the second nacelle door 26.

In some embodiments, the orientation of the nacelle doors 24 and 26 may be different than that shown in the drawings. For example, the nacelle doors 24 and 26 may be reversed.

In another example, both nacelle doors 24 and 26 may be on a respective side of the nacelle 22, for example for a typical under wing propulsion system.

In some embodiments, the latch assemblies 30 may be axially spaced such that a single operator alone cannot disengage the latch assemblies 30. In this manner, at least two operators may be present to disengage the latch assemblies 30 and, thus, be present to support the nacelle doors 24 and 26 when opening. However, in other embodiments, the latch assemblies 30 may be spaced such that a single operator can disengage all of the assemblies, or a single latch assembly 30 may be employed, for example where the nacelle is relatively small.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A catch assembly, comprising:
a keeper;
a guide; and
a catch including a catch mount, a catch arm and a catch hook;
the catch arm cantilevered from the catch mount, and extending longitudinally away from the catch mount to a distal end of the catch; and
the catch hook connected to the catch arm at the distal end;
wherein the catch is configured to bias the catch hook against the guide, and the catch hook is configured to slide longitudinally along the guide from a first position to a second position where the catch hook engages the keeper; and
wherein the catch hook is configured to lift off from the guide and disengage from the keeper when the catch arm is subject to an external force with at least a component that is greater than and opposite to an internal force that biases the catch hook against the guide.

2. The catch assembly of claim 1, wherein the catch arm is connected to the catch mount at a connection, and the catch arm is configured to pivot about the connection.

3. The catch assembly of claim 1, wherein the catch is configured as a monolithic body.

4. A catch assembly, comprising:
a keeper;
a guide; and
a catch including a catch mount, a catch arm and a catch hook;
the catch arm cantilevered from the catch mount, and extending longitudinally away from the catch mount to a distal end of the catch; and
the catch hook connected to the catch arm at the distal end;
wherein the catch is configured to bias the catch hook against the guide, and the catch hook is configured to slide longitudinally along the guide from a first position to a second position where the catch hook engages the keeper; and wherein the catch is configured from a single sheet of cut and formed material.

5. The catch assembly of claim 1, wherein
the catch further comprises a hinge and a spring;
the catch arm is connected to the catch mount by the hinge; and
the spring is configured to bias the catch arm towards the guide.

6. The catch assembly of claim 1, wherein the catch arm is rigid.

7. The catch assembly of claim 1, wherein
the guide comprises a base and a pair of rails disposed laterally on opposing sides of and connected to the base; and
the catch hook is configured to slide longitudinally against the base while laterally between the rails.

8. The catch assembly of claim 1, wherein the keeper is configured as a portion of an aircraft nacelle longeron.

9. An assembly for a nacelle of an aircraft propulsion system, the assembly comprising:
a nacelle component;
a nacelle door configured to move between a closed position and an open position;
a latch assembly configured to secure the nacelle door to the nacelle component when the nacelle door is in the closed position; and
a catch assembly configured to secure the nacelle door to the nacelle component when the nacelle door is in a partially open position between the closed position and the open position;
wherein the nacelle door comprises a first nacelle door, and the nacelle component comprises a second nacelle door configured to move between a closed position and an open position.

10. The assembly of claim 9, wherein the catch assembly is discrete from the latch assembly.

11. The assembly of claim 9, wherein a gap extends between the nacelle door and the nacelle component when the nacelle door is in the partially open position, and the gap is sized large enough to enable disengagement of a catch of the catch assembly for enabling movement of the nacelle door from the partially open position towards the open position.

12. The assembly of claim 11, wherein the gap is sized large enough for a hand of an operator to pass through the gap and reach the catch.

13. The assembly of claim 9, wherein
the catch assembly comprises a keeper and a catch;
the catch includes a catch mount, a catch arm and a catch hook;
the catch arm is cantilevered from the catch mount, and extends longitudinally away from the catch mount to a distal end of the catch;
the catch hook is connected to the catch arm at the distal end; and
the catch hook is configured to move longitudinally from a first position to a second position where the catch hook engages the keeper.

14. The assembly of claim 13, wherein
the catch assembly further comprises a guide;
the catch is configured to bias the catch hook against the guide; and
the catch hook is configured to slide along the guide from the first position to the second position.

15. The assembly of claim 13, wherein
the nacelle door is in the closed position when the catch hook is in the first position; and
the nacelle door is in the partially open position when the catch hook is in the second position.

16. The assembly of claim 9, further comprising:
a second catch assembly configured to further secure the nacelle door to the nacelle component when the nacelle door is in the partially open position; and
the second catch assembly spaced from the catch assembly such that a single operator alone cannot disengage both the latch assembly and the second latch assembly.

17. An assembly for a nacelle of an aircraft propulsion system, the assembly comprising:
a nacelle component;
a nacelle door configured to move between a closed position and an open position;
a latch assembly configured to secure the nacelle door to the nacelle component when the nacelle door is in the closed position; and
a catch assembly configured to secure the nacelle door to the nacelle component when the nacelle door is in a partially open position between the closed position and the open position;
wherein the nacelle door is arranged such that gravity biases the door towards the open position when the door is in the closed position and the partially open position.

18. The assembly of claim 17, wherein
the catch assembly comprises a keeper and a catch;
the catch includes a catch mount, a catch arm and a catch hook;
the catch arm is cantilevered from the catch mount, and extends longitudinally away from the catch mount to a distal end of the catch;
the catch hook is connected to the catch arm at the distal end; and
the catch hook is configured to move longitudinally from a first position to a second position where the catch hook engages the keeper.

19. The assembly of claim 18, wherein
the catch assembly further comprises a guide;
the catch is configured to bias the catch hook against the guide; and
the catch hook is configured to slide along the guide from the first position to the second position.

20. The assembly of claim 18, wherein
the nacelle door is in the closed position when the catch hook is in the first position; and
the nacelle door is in the partially open position when the catch hook is in the second position.

* * * * *